Jan. 10, 1939.　　　　P. VAN H. WEEMS　　　　2,143,042
METHOD OF AND APPARATUS FOR NAVIGATION

Filed July 31, 1929

INVENTOR
*Philip Van Horn Weems.*
BY
*Harold Dodd*
ATTORNEY

Patented Jan. 10, 1939

2,143,042

UNITED STATES PATENT OFFICE 2,143,042

METHOD OF AND APPARATUS FOR NAVIGATION

Philip Van Horn Weems, Coronado, Calif.

Application July 31, 1929, Serial No. 382,561

3 Claims. (Cl. 33—1)

(Granted under the act of March 3, 1883, as amended April 30, 1928; 370 O. G. 757)

The science of navigation has been developed by mankind from the earliest time. When vessels did not venture out of sight of land the science of navigation was confined to fixing the position of ships by observing land marks; that is, it was confined to what is known as piloting. Later when ships ventured into the open sea, out of sight of land, it became necessary for the navigator to find other objects by means of which the position and maintenace of direction of ships may be attained. Such objects were found in the heavenly bodies, it having already been discovered that different definite relations exist between heavenly bodies and positions on the earth's surface for each interval of time.

Heretofore, the most usual practice of determining an unknown position and properly maintaining the course of a vessel, by a navigator under such circumstances that he was restricted to observable heavenly bodies, involved laborious computation, reference to known data and an assumption of an approximate position of the craft at each recourse to such practice. The uncertain difficulties of such practice may be typified by the fact that a navigator at a place under such circumstances that he could not make any reasonably approximate assumption as to his location, as one of the substantially known factors of his problem, was practically hopeless of determining his position within a reasonable time or properly maintaining the course of his vessel.

The material increase in water-craft speeds had relatively little tendency to spur the development of navigation practices due, no doubt, to the existence of reliable compensating data and availing means as well as the ability of such craft, when desired, to stand by for observation.

With the advent of aviation a new necessity arose. The speed of aircraft is many times greater than the speed of surface craft. Methods which were sufficiently expeditious for surface craft became hopelessly slow for aerial navigation introducing not only unpermissible delay but positive danger to person and property. Airplanes must maintain high speeds to remain safely in the air and cannot stand by for observation, and frequently have to cruise above the clouds obscuring the earth's surface, in which case sole reliance must be placed on the observation of heavenly bodies. The carrying capacity of aircraft is many times less than the carrying capacity of even a small ocean-going vessel and navigation apparatus and data which was convenient on board ship became impossibly heavy and cumbersome when an attempt was made to use it on aircraft.

Even if this were practical and possible, aircraft frequently is operated by one man whose time and attention are practically continuously occupied in keeping such craft safely in the air and hence he could not possibly, practically or safely refer to such navigation apparatus and data to determine his location or properly maintain his course.

Heretofore it has required years of study to train an efficient navigator, but with the advent and prevalency of aircraft, which are cheaper and more readily produced than watercraft, the necessary adequate increase of the number of efficient navigators by such existing practices was practically impossible.

It is thus apparent that with the advent of aviation the necessity arose and the stage was set for a radical step in advance in the science of navigation. So radical is this step that the mere contemplation of it has given rise to a new word, "avigation", forceful evidence of differences which exist and difficulties to be overcome.

The fundamental object of my invention is to provide a method and apparatus for improving the science of avigation so that it may fill the needs of aviation.

A further fundamental object of my invention is to reduce many fold the schooling heretofore requisite to make an efficient navigator as well as avigator, and to provide such method and apparatus as may be conveniently employed with precision under the more exacting conditions of aviation by those of far less than the heretofore required educational qualifications, and by which the desired result may thereby be attained with equal or greater precision in far less time than has heretofore been required even under favorable conditions.

In practicing my new method of avigation I select and employ such old practices and apparatus as I find suitable for my needs but my invention resides not alone in the novel function and results of such employment of old practices and apparatus but also in their combination with new methods and apparatus which I have developed and provided. It is old in this art that a different definite relation exists for each instant of time between the heavenly bodies and points on the earth's surface. Such changing relation heretofore has been determined by laborous computations. My invention greatly reduces the necessary time required for such determinations by providing, preparatory to its practice, relatively few, simple, light and convenient graphic reference charts of such relation covering desired periods of time and portions of the earth's surface, and by employing in a new way a portion of such charts in readily ascertaining each unknown location.

Furthermore, my invention dispenses with the necessity of making an approximate assumption of the navigator's position required as one of the known factors by the most used practices prior to my invention.

In the selection of the preparatory work, its preparation and presentation, resides the very essence of the development of the science of navigation. So also an essence of my invention resides in my peculiar selection, preparation and presentation of the preparatory work, and its then association with methods and apparatus devised by me to fully realize the benefits of such preparatory work, thus providing a practical and substantial improvement in the art of avigation.

While my invention is primarily designed for avigation during the night-time, the same may be employed advantageously in navigation by watercraft, any time two or more fixed heavenly bodies are observable.

To attain these and other objects of my invention, and in accordance with the general features of this unitary, related and interdependent invention, my improved method contemplates a series of preliminary or preparatory steps, which need be made but once, as the same are retained in form available for all subsequent determinations, and a number of determining steps, which are required to be made for each determination, and in which said preparatory steps are employed.

Said preparatory series, which for convenience are arranged in the following arbitrary sequence, includes the following selected and corelated steps:

1. Selecting and grouping the fixed heavenly bodies, preferably into pairs, observable at substantially different bearings at the same time in a plurality of selected different navigable areas.

2. Selecting a common characteristic of each of said grouped pairs of bodies evidenceable in all portions of each selected navigable area. Selecting and grouping, on a means severally representing said areas, a family of loci representing said characteristic of each body of each pair of bodies. The substantially different bearings of the bodies forming a pair, and the species of loci selected for each family, being such that loci of each family intersect at different points throughout each represented area. The characteristics of each body forming a pair which I prefer to select is altitude, and whether the body be rising or setting. Each different locus of each family represents a different altitude of its respective body. The specific species of loci I prefer to select and group on the means representing each of said areas comprise definite lines or tracks which afford definite intersections with the lines or tracks comprising the family or families with which they are grouped on the representation of each particular area. On said means I associate with each family of lines means, conveniently in the form of scales at an angle to each other, for directly or by interpolation denoting the altitudes of the bodies represented by each family. I associate with each area so represented on said means the name of the bodies, and whether they be rising or setting, represented by said families of lines or tracks, and associate with said names the general direction of the families of lines or tracks respectively representing the altitudes of said named bodies. On said means I also associate with the points of intersection of the families of lines or tracks means for directly or by interpolation denoting the latitude as well as the local sidereal time appropriate to the several points of intersection. Specifically, the means for severally denoting altitudes, latitudes and local sidereal times have been illustrated in the drawing simply as scales each extending across a different portion of their respective areas.

3. The successful practice of my invention by one theretofore inexperienced in navigation requires only a relatively short course of study of the names and characteristics of the fixed heavenly bodies and of the proper use and application of my invention, instead of the far longer course of study heretofore prerequisite for efficient and safe navigation. Said permanent representations on said means affords their manual, simple, convenient, and time saving repeated employment in the particular manner and sequence hereinafter stated in all subsequent ascertainments according to my invention of unknown positions, as well as in checking courses. The subsequent steps of my method which must be performed for each ascertainment of an unknown position, or at suitable intervals in checking a course, are as follows:

4. Selecting the pair of fixed heavenly bodies, having a substantial angle between their bearings, observable at the unknown position, or at each position where the course is to be checked, and noting whether said bodies be rising or setting.

This selection affords ready reference to the particular area, prepared in accordance with step 2, to which recourse must be had in step 6. This reference is facilitated by the names, and indications of their rising, setting, or similar characteristics, of the bodies, prominently distinguishing each of the many areas which may conveniently be represented upon said means.

5. At the unknown position, or at each position where the course is to be checked, by a sextant, bearing means for indicating the altitudes at which bodies may be observed, ascertaining the several apparent altitudes of the next preceding selected pair of said bodies, and noting said altitudes with the Greenwich sidereal time of said ascertainment.

6. Selecting the particular area of said means associated with the names and noted characteristics of said bodies observed at the unknown location. Then selecting thereon the particular locus, line or track of each family represented thereon said noted altitudes of the respective bodies observed. Then tracing or following said selected loci, lines or tracks to the point at which they intersect with each other. Then, conveniently from an inspection of said means representing said particular area, ascertaining the latitude and the local sidereal time of said point of intersection. This information is afforded by the point, nearest said intersection, on said means or scales denoting latitude and local sidereal time. Thereby, the latitude and local sidereal time of the unknown position, or point at which the navigational course is being checked, are conveniently and quickly afforded manually.

7. Then subtracting the thus ascertained local sidereal time from the Greenwich sidereal time of the observation of the altitudes made and noted pursuant to step 5. (The result expresses longitude in hours, minutes and seconds of time.)

8. Then converting the result of said subtraction, into longitude expressed in degrees, minutes and seconds of arc. This may be manually performed by the aid of the means indicated in Fig. 3.

Applicant was first to conceive of the employment of families of graphic loci in ascertaining an unknown position, as well as in periodically checking a navigational course. He was also the first to adapt said loci to successful employment in said art. The problems he was required to solve in accomplishing said adaptation and employment are typified by the following:

That selected pairs of fixed heavenly bodies which may be observable in one navigable area at one time may, for instance, also be observed in a different area, and how may such areas be distinguished. What characteristic of the pairs of bodies may the families of graphic loci most advantageously represent? What characteristic of the pairs of graphic loci may represent the unknown or the course-checking position and how may its location thereby readily become known?

The following typical inventive concepts resulting in the solution of said problems essentially contributed to applicant's adaptation and successful employment of the graphic loci method to the art of navigation:

(a) That the pairs of bodies observable in substantially different navigational areas had characteristics, as to their rising, setting and/or bearing, which were different in each of such areas, and that the association of such characteristics with the names of each of the pairs of bodies readily distinguished the areas;

(b) That the altitudes of each body forming the pairs was the characteristic most advantageously represented by appropriate families of graphic loci, that the most advantageous type of graphic loci was in the form of graphic lines or tracks, that the pairs of bodies be selected such that said family of lines or tracks representing the altitudes of one of each pair of the bodies shall intersect the lines or tracks of the family representing the altitudes of the other body of the pair, that the general direction of the families of graphic loci would be different in instances typified in paragraph (a) and which general directions should also be associated with the names of the bodies represented by the families, and that the loci of each family be associated with a scale facilitating the ascertainment of the altitude represented thereby;

(c) That the point of intersection of the particular one of a family of graphic loci lines or tracks representing an observed altitude of one of a selected pair of bodies with the particular one of a family of graphic loci lines or tracks representing an observed altitude of the other body of said pair, represents the place where said bodies were respectively observed at said altitudes; that, to afford means for manually ascertaining the location of the place of such observations, I have associated with said points of intersection scales extending at an angle to each other across the means bearing said families of loci and respectively representing the latitude and local sidereal time appropriate to said points of intersection.

It is the entity comprising said concepts that constitutes applicant's complete and practical graphic loci method of manually ascertaining an unknown position, as well as of periodically checking a navigational course. My method may be safely practiced even in a one-man aircraft where the mind and hands of the pilot must be substantially free from pursuits other than the keeping of such craft safely in the air.

The far shorter course of study requisite for the successful practice of my invention enables the development of capable navigational personnel in numbers proportionate to any desired relatively quick expansion of the number of aircraft, whereas the far longer course of study essential to attain proficiency in prior navigational practice hampered such expansion because it could not develop avigators at the rate at which it was possible to expand the number of aircraft.

To demonstrate the practical utility of my method of manual manipulation improvement over the prior practice of arithmetically solving celestial triangles to attain each determination of an unknown position, or at each checking of the course, I have provided a related, dependent, improved and novel apparatus for the most advantageous, efficient and time saving practice of my method. Said method and apparatus comprise a unitary invention of interdependent and correlated components. The provided apparatus may also serve as an example, to those skilled in the art, of the facility with which, after becoming familiar with my invention, the many forms of apparatus may be adapted, with or without substantial modification, to the practice of my method whereby an unknown position may be ascertained, or a navigational course checked, far more expeditiously than heretofore.

Without my said method said apparatus, except the sextant, may not conveniently or advantageously be employed for any useful purpose.

This invention involves highly technical matters little understood by other than astronomers and navigators and great pains have been expended in describing and rendering the same readily understood by those less technical without hampering in the last the understanding therefrom of those skilled in the art; but the great effort expended to make this invention appear quite simple should not militate against its breadth and scope.

For a more complete understanding of the objects of my invention as well as of the invention itself, reference may be had to the accompanying drawing in which.

Figure 1:
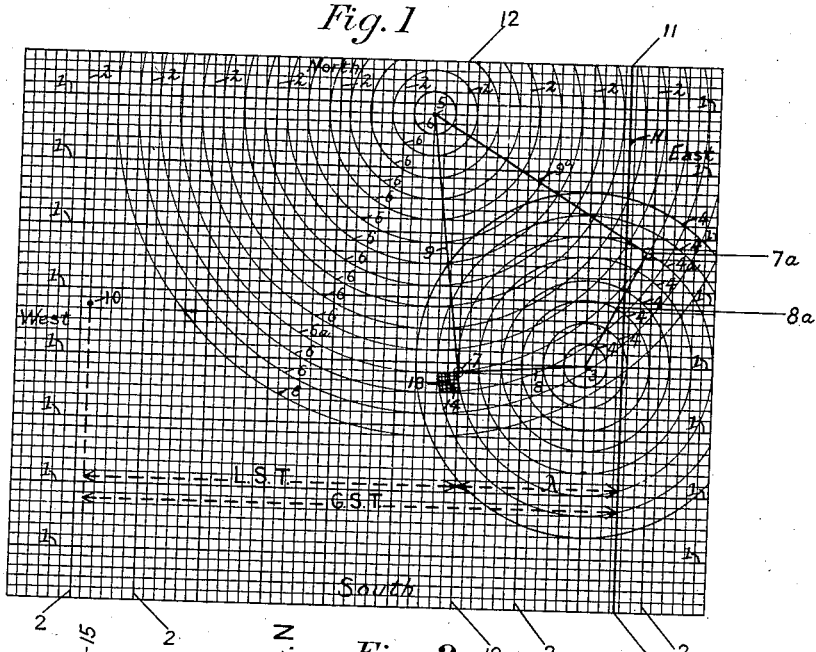
Figure 1 is a diagrammatic view of a typical portion of the earth's surface showing certain astronomical and navigational elements incident to my invention.

Referring to Figure 1, lines 1 represent parallels of latitude on the earth's surface, lines 2 represent meridians of longitude on the earth's surface. As is already well known, a position on the earth's surface is fixed by its latitude and longitude, visualizing this much of Figure 1 as a chart upon which 3 represents a point on the earth's surface directly below any selected heavenly body at a particular instant of time. Neglecting for the moment the rotation and other movements of the earth, it is obvious that at any given instant a point on the earth's surface can be found which is directly below a selected heavenly body. This fact may be expressed by saying that for every selected heavenly body there is at a given time a point on the earth's surface at which the heavenly body is in the zenith, that is, the altitude of the heavenly body is 90 degrees. The point 3 therefore represents the point on the earth's surface where the altitude of the selected heavenly body is 90 degrees. If, as we have assumed by neglecting the rotation and other movement of the earth, there is no apparent relative motion between the earth and the selected heavenly body, the point 3 has a definite and constant latitude and longitude.

This assumption regarding the movement of the earth is not as violent as might appear for it will be shown that when a particular instant of time is also selected this in effect stops the relative motion between the heavenly body and the earth, permitting the establishment of a fixed portion for the point 3.

If then, we proceed on the surface of the earth from the point 3 in any direction the selected heavenly body apparently leaves the zenith and has some altitude less than 90 degrees. If we proceed over the earth's surface to a point 10 degrees from the point 3 the altitude of the selected heavenly body will be observed to be 80 degrees. We can thus draw a circle 4 with the point 3 as a center and a radius of 10 degrees on the earth's surface. At every point on the circle thus drawn the altitude of the selected heavenly body is eighty degrees, and conversely if the altitude of the selected heavenly body is observed to be eighty degrees the observer must be at some point on the circle thus drawn. Similarly, other circles may be drawn with say 20, 30, 40, etc., degrees radius, respectively. These circles 4 are known as lines of position and play an important part in the science of navigation and in my invention. These circles 4 may be drawn with any desired radius up to ninety degrees (on which latter circle the selected heavenly body is in the horizon); they may be drawn on the surface of a sphere of any radius representing the earth, or if found more convenient they may be drawn on a plane surface to any scale by any of the well known methods of projection.

With such a system of circles drawn for any selected heavenly body the observer, by observing the altitude of the selected heavenly body above the horizon, determines that he is on that circle which has for its radius ninety degrees minus said altitude.

If another heavenly body is selected a second point 5 may likewise be determined and a similar system of circles 6 may be drawn with a point 5 as a center. If the two heavenly bodies are suitably selected the system of circles of the one will partially overlap the system of circles of the other, giving rise to a plurality of points of intersection of said circles, such as at 7 and 7a.

If then the observer determines, as above described, that he is on a certain circle 4a having the point 3 as a center and also determines that he is on a certain circle 6a having a point 5 as a center he knows that he is either at the point 7 or the point 7a upon the earth's surface.

He can further determine at which of these two points he is by noting, by means of his compass or otherwise, the bearings of the selected heavenly bodies. These bearings will either be 8 and 9, respectively, or 8a and 9a, respectively, and thus the position of the observer upon the earth's surface has been fixed. The determination of these bearings does not have to be accurate and in some cases, as will be shown, is nothing more than the determination of whether the selected heavenly body is rising or setting.

If, as in Figure 1, these systems of circles are drawn upon a chart showing latitude and longitude, the observer's position in latitude and longitude can be at once read from the chart. This, however, is not practicable because of the rotation of the earth.

The points 3 and 5 and their associated circles are not stationary upon the earth's surface but progress across the earth's surface from east to west at the velocity of the rotation of the earth. It is also to be noted that the points 3 and 5 do not change in position with respect to one another, if they are associated with fixed points on the celestial sphere, that is if the selected heavenly bodies are fixed stars. If the selected heavenly bodies are not fixed stars, but are the sun, moon or planets, new elements are introduced, with consequent modifications of methods and apparatus.

Therefore, the subject matter of the present invention is confined, in its specific aspect, to the case in which the selected heavenly bodies are fixed stars.

It therefore becomes necessary to establish a convenient relation between the instantaneous position of the points 3 and 5 and latitude and longitude as measured upon the earth's surface. It will be noted, however, that the latitude of these points do not change, it is only the longitude that changes.

To establish this convenient relation certain navigational concepts are employed. A fixed point in the celestial sphere is arbitrarily selected. The vernal equinox has been thus arbitrarily selected and 10 represents a point on the earth's surface directly below the vernal equinox. The line 11 represents the meridian of Greenwich upon the earth's surface. The time which has elapsed since the vernal equinox passed over the meridian of Greenwich is called Greenwich Sidereal Time. This time, expressed in hours, minutes and seconds, may be readily converted into degrees, minutes and seconds of rotation of the earth. The line G. S. T. of Figure 1 therefore represents the Greenwich Sidereal Time. Assuming the observer to be at the point 7, the line 12 is the local meridian of the observer. Similarly, the line L. S. T. is the Local Sidereal Time of the observer. The line λ of Figure 1 is obviously the longitude of the observer. From this it immediately follows that the longitude of the observer is equal to the Greenwich Sidereal Time minus the Local Sidereal Time. Of course the Greenwich Sidereal Time and the Local Sidereal Time are variables while, as long as the observer remains fixed upon the earth's surface, the longitude is a constant, but by providing the observer with a timepiece which keeps Greenwich Sidereal Time and the time of observation is determined thereby, the G. S. T. of the observation becomes fixed directly instead of the usual prior practice of noting the observation-time on a timepiece keeping standard time and thereafter converting such time to G. S. T. This also more conveniently fixes the L. S. T. of the observer's position.

From the foregoing it can be seen that in Figure 1 there are two distinct systems of coordinates which may be separately visualized. The first system includes the points 3, 5, 10, the circles 4, 4a, 6 and 6a. All points on this system are in fixed positional relation to one another.

With any point on this system may be associated a constant distance corresponding to L. S. T., which is in reality the measure of the distance from the point 10 to the chosen point in the system measured parallel to a parallel of latitude.

The second system of coordinates includes the lines 1 and 2, 11 and 12. Due to the rotation of the earth there is relative motion between these two systems of coordinates but for any given instant of Greenwich Sidereal Time the instantaneous position of the first system with respect to the second system may be determined and the two systems then used as a single system of coordinates.

Numeral 13 represents a portion of the area in which the circles having point 3 as a center overlap the circles having the point 5 as a center. The network 14 of portion 13 is formed by drawing other circles similar to 4 and 6 at predetermined convenient intervals.

Figure 2:
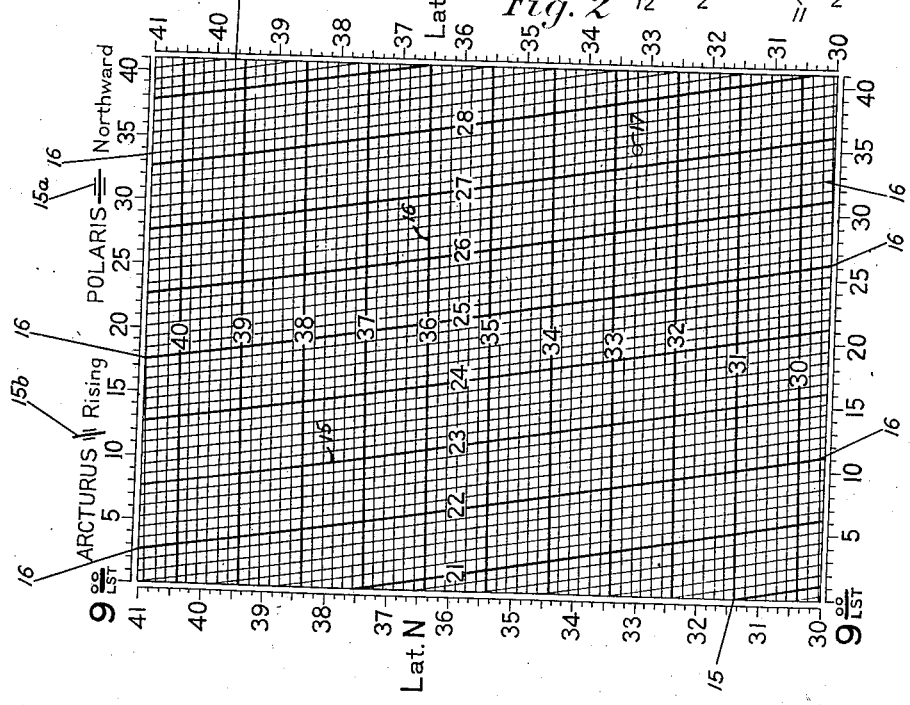
Figure 2 is an enlarged view of portion (13) of Figure 1 typical of other portions of earth's surface to be similarly charted.

This portion 13 has been enlarged and reproduced in Figure 2 of the accompanying drawing; and as a preferred embodiment of part of my invention I have selected, constructed, prepared and presented this portion and a number of other such portions of these and similar systems to form a means which I employ in advantageously practicing my method of avigation. This means is presented preferably in the form of a book or other convenient form for reference. Figure 2 is therefore also a characteristic page or section of such aforesaid convenient form of reference.

Referring to Figure 2, the two stars selected are Arcturus and Polaris. The points which would correspond to points 3 and 5 in Figure 1 are of course not included within the bounds of Figure 2. The approximately vertical curves 15 of Figure 2 are, however, arcs of the circles 4 of Figure 1 and the approximately horizontal curves 16 of Figure 2 are arcs of the circles 6 of Figure 1. The horizontal line of numerals preferably across the middle of Figure 2 are the altitudes in degrees and minutes of the star Arcturus. The vertical lines of numerals preferably across the middle of Figure 2 are the altitudes in degrees and minutes of the star Polaris. The least count of this network is ten minutes of altitude but readings of two minutes of altitude can be accurately estimated in the interstices by the eye. A minute of altitude corresponds to a nautical mile on the earth's surface. Preferably along the vertical edges of Figure 2 are numerals from 30 to 41. These numerals are degrees of latitude and correspond to the lines 1 of Figure 1. Preferably across the top and bottom of Figure 2 are rows of numerals from 0 to 40. These numerals indicate minutes of Local Sidereal Time and correspond to the line L. S. T. of Figure 1, and are a means for determining the Local Sidereal Time of every point within the area of Figure 2. It will be noted that in place of the numeral 0 appears the numeral 9 which is the number of hours of Local Sidereal Time corresponding to the zero minute point.

Preferably at the top of said Figure 2 are the names of the fixed heavenly bodies whose observations are indicated thereon by said lines 15 and 16, while associated with each of said names are respectively relatively short alternate light and heavy lines 15a and 15b corresponding in direction with said respective lines 15 and 16 in order to avoid possible confusion as to which lines represent said named heavenly bodies.

From the description of Figure 1, it will be remembered that any point on the network of the circles of Figure 2 is a point on the first system of coordinates of Figure 1 as, for instance, the point 7 of Figure 1; that it is an intersection of two lines of position and definitely determines the position of the observer relative to the earth's surface when the first system of coordinates of Figure 1 becomes fixed relative to the second system of coordinates by noting the Greenwich Sidereal Time of observation.

A chart such as is described in Fig. 2, I therefore use as follows:

The altitude of the star Arcturus is observed in a manner hereafter to be described. At preferably the same, or substantially the same, instant of time the altitude of the star Polaris is also observed. The Greenwich Sidereal Time of these observations is noted in a manner hereafter to be described.

Assume the observed altitude of Arcturus to be 27 degrees 15 minutes and the observed altitude of Polaris to be 32 degrees 40 minutes. Assume also that the Greenwich Sidereal Time is 17 hours 28 minutes 20 seconds. 15b on Fig. 2 indicate that the lines within the border of Fig. 2 representing the different observable altitudes of Arcturus run horizontally, while lines 15a thereon, indicate that the lines representing the different observable altitudes of Polaris, run vertically. The altitude values of said lines are represented respectively by the central vertical and horizontal rows of figures. Said observed 27 degrees 15 minutes is represented in Fig. 2 by the space between the first and second lines 16 above the heavy line 16 numbered "27". Said observed 32 degrees 40 minutes is represented in Fig. 2 by the fourth vertical line 15 to the left of the heavy line 15 marked "32". Follow this space and said line to their intersection. The point 17 is the intersection of the two altitude curves 15 and 16 in question. Projecting this point to the top or bottom of Fig. 2 the latitude is found to be 33 degrees and 12 minutes north. Projecting the point 17 to the right or left of Fig. 2 the Local Sidereal Time is found to be 9 hours, 34 minutes and 40 seconds. Subtracting the Local Sidereal Time from the Greenwich Sidereal Time as explained in connection with Fig. 1 gives the longitude as 7 hours, 53 minutes and 40 seconds. This being measured to the westward from Greenwich, as indicated in Fig. 1, and being less than 12 hours, obviously gives a "west" longitude. Reduced to degrees, minutes and seconds of arc, it becomes 118 degrees, 25 minutes, 0 seconds longitude west. The position of the observer as fixed by these stated observations is, therefore, 33–12 N., 118–25 W.

By the above method and by the use of the means disclosed in Figure 2, the position of the observer on the earth's surface can be determined in less than a minute from the time of observation and with but one arithmetic computation, to wit, said time subtraction. Heretofore it has been necessary for navigators to perform comparatively laborious computations and it has taken him at least manyfold the trouble and time to attain the same results that are attained by my invention in less than a minute, besides my invention avoids requiring equipment in the form of log books which are not only inconvenient but decidedly undesirable and sometimes a prohibitive weight in aircraft and an unsafe distraction in a one-man plane.

The speed at which an aircraft travels makes the time element all important and I have provided a method of and means whereby the position of the observer may be fixed in a very short period of time with light and easily manipulated means, I have provided a method and apparatus for avigation which overcomes the difficulties which have beset the aviators heretofore and have rendered available to them a method and apparatus which makes practical and safe avigation an accomplished fact.

My invention also dispenses with the long years of study of navigation required in the prior art and substitutes therefor a relatively short and simple course in becoming acquainted with the relatively fixed heavenly bodies and the use of the herein explained instruments. This is of great practical advantage and commercial importance due to the relative cheapness of aircraft over watercraft and the facility with which they may be constructed in large numbers and quickly and competently manned by the employment of my invention.

It is, however, impracticable to transport chronometers in aircraft and furthermore chronometers as a rule keep Greenwich Civil Time instead of Greenwich Sidereal Time. To eliminate the weight and bulk of a chronometer and to dispense with the computations necessary to convert Greenwich Civil Time into Greenwich Sidereal Time, and otherwise, I have provided an aero chronometer, which is fully described in my copending application, Serial No. 382,562, filed July 31, 1929. By means of this aero chronometer the avigator is enabled to determine the Greenwich Sidereal Time as readily as he would read civil time from a watch, thus preventing any delay in the determination of, for instance, Greenwich Sidereal Time and correspondingly increasing the rate of speed with which his position may be determined.

From the foregoing it will be apparent that step 5 of my said method is only capable of being manually performed and consists in the selection of the most advantageous pair of fixed heavenly bodies which may be observable, or most advantageously observable, at the time and place when and where an unknown position is desired to be ascertained.

The manner of the performance of steps 6 and 7 of my method has been heretofore clearly indicated, as has the step 8 in reference to the description of Figures 1 and 2.

The performance of step 9 of my method may be mental or physical, as is likewise step 10, although step 10 may be facilitated by reference to a table.

It is furthermore apparent from the foregoing that step 4 of my method would be impracticable and unsafe in connection with all prior practices in this art, and that it is only in connection with my invention that step 4 is rendered practicable and safe.

The charts of my invention may not be used or useful in the practice of my invention without the functional precedent cooperation therewith of the sextant. The chart of my invention appropriate to the particular observation of a pair of heavenly bodies functions to and does transform and reduce to a different state or thing, namely, (a) the angle of the sextant-observed altitude of each of the observed bodies into a line on the chart, (b) the lines into an intersection point by following the appropriate lines to their intersection, (c) the point into two different things which are latitude and local sidereal time; and as such point thus achieved represents the unknown location, said latitude and local sidereal time are those of the position from which the heavenly bodies were observed and render said position known by its latitude, while its local sidereal time may readily be transformed into its appropriate longitude. There exist occasions where the latitude is the only thing required by the navigator or avigator to render his position known, in which case the local sidereal time factor need not be ascertained or transformed into longitude.

The invention hereinbefore described may be manufactured and used by or for the Government of the United States for governmental purposes without the payment to me of any royalty thereon or therefor.

Having now so fully and completely described my invention that others skilled in the art may make and use the same therefrom, what I claim and desire to secure by Letters Patent is:

1. Means for determining a navigator's unknown location, comprising means bearing a plurality of sets of intersecting altitude indicia lines of a pair of preferably fixed heavenly bodies observable at substantially different bearings at the same time in an area including said unknown position, said indicia extending throughout an area and representing and being designated by the various altitudes at which each of said bodies may be observed from preferably all points within said area, there being associated therewith indicia of the latitude and time pertinent to said area, in combination with a sextant for observing the altitudes of said bodies at a definite Greenwich Sidereal Time, whereby observations of the altitude of said bodies from said unknown location at a definite time determines the set of altitude indica whose intersection associated with the latitude and time pertinent to said area and with the time of observation quickly makes said location known.

2. The method of making a chart for facilitating the determination of a navigator's unknown position including the steps of disposing on and throughout the substantial area of a substance representing a portion of a navigable area a plurality of sets of the intersecting portions of circles, each of whose centers is substantially coincident with the zenith point of its respective one of a selected number of heavenly bodies, each circle portion of said sets of circle portions passing through points from which their respective bodies may be observed at the same altitude at substantially the same period of Greenwich sidereal time and each different circle portion of each set affording said observation at different altitudes, and associating with said portions on said chart indicia of their respective altitudes, local sidereal times and latitudes, whereby when said number of bodies are observed from an unknown position at substantially the same interval of Greenwich sidereal time, each at a definite altitude, which altitudes designate the appropriate set of said portions whose intersection represents the point from which said observation was made and which intersection when asociated with its particular portions of said indicia affords the local sidereal time and latitude of said observation point and whereby the subtraction of the thus afforded local sidereal time of said observation point from the Greenwich sidereal time of said observation gives the longitude expressed in time of said unknown position.

3. The method of making a chart for facilitating the determination of a navigator's unknown position, comprising the steps of covering a substantial portion of a surface of a chart of a navigable area including said position with a plurality of sets of intersecting Sumner lines of position of a number of fixed heavenly bodies selected in pairs according to their visibility at substantial angles from each other in different parts of said area, each line of each set representing substantially the same time and the plurality of sets covering a substantial interval of time, associating with said lines on said chart indicia of altitude, local sidereal time and latitude relative to said lines and intersections and the names of the selected bodies, whereby upon observing at said unknown position the altitudes of a pair of said bodies at a definite Greenwich sidereal time, which altitudes designate the appropriate set of lines on said chart whose intersection represents the unknown position, and which intersection when associated with its particular portion of said indicia affords the local sidereal time and latitude of the unknown position, and whereby the subtraction of said afforded local sidereal time from the Greenwich sidereal time of said observation affords the longitude expressed in time of the unknown position.

PHILIP VAN HORN WEEMS.